United States Patent [19]

Gilead

[11] 4,126,998

[45] Nov. 28, 1978

[54] IRRIGATION APPARATUS

[76] Inventor: Gideon Gilead, P.O. Box 26025, Jerusalem, Israel

[21] Appl. No.: 842,160

[22] Filed: Oct. 14, 1977

[51] Int. Cl.$^2$ .................... E02B 13/00; B05B 15/00
[52] U.S. Cl. ........................................ 405/51; 239/542
[58] Field of Search ........................ 61/10–13, 61/1 R; 239/542, 547, 543, 450; 156/217, 203

[56] References Cited

U.S. PATENT DOCUMENTS

| | | | |
|---|---|---|---|
| Re. 28,095 | 7/1974 | Chapin | 61/12 |
| 142,413 | 9/1873 | Pugh | 61/13 |
| 965,895 | 8/1910 | Hardin | 61/13 |
| 2,075,590 | 3/1937 | North | 61/13 |
| 3,293,861 | 12/1966 | Hinde | 61/1 R |
| 3,302,408 | 2/1967 | Schmid | 61/13 |
| 3,316,673 | 5/1967 | Mason et al. | 61/13 X |
| 3,461,675 | 8/1969 | Izatt | 61/13 X |
| 3,467,142 | 9/1969 | Boyle et al. | 239/450 X |
| 3,567,134 | 3/1971 | Smith | 239/547 |
| 3,774,850 | 11/1973 | Zeman | 239/542 |
| 3,870,236 | 3/1975 | Sahagun et al. | 239/542 |
| 3,873,030 | 3/1975 | Barragan | 239/542 |
| 3,939,875 | 2/1976 | Osborn et al. | 61/12 X |
| 4,022,384 | 5/1977 | Hoyle et al. | 61/12 X |
| 4,047,995 | 9/1977 | Leal-Diaz | 156/203 |
| 4,065,926 | 1/1978 | Brandt | 61/13 |

Primary Examiner—Dennis L. Taylor
Attorney, Agent, or Firm—Browdy and Neimark

[57] ABSTRACT

Irrigation apparatus comprising first and second layers of sheet material, at least one of the first and second layers being configured in relief and the first and second layers being bonded together at touching surfaces such that the bonding of the touching surfaces defines a liquid conduit, at least one pressure reducing path associated therewith and an exit port from each of the at least one pressure reducing paths.

11 Claims, 9 Drawing Figures

IRRIGATION APPARATUS

FIELD OF THE INVENTION

The present invention relates to water distribution apparatus and more particularly to irrigation apparatus formed of two layers of thermoplastic material and forming both a liquid flow conduit and a pressure reducing path.

BACKGROUND OF THE INVENTION

Various types of drip irrigation apparatus are known to be formed of two or more layers of a thermoplastic material, bonded together by heat sealing. A common problem in such apparatus has been the provision of a communication path between the flow conduit and the pressure reducing path and between the pressure reducing path and the outside. According to one prior art technique, such communication paths are formed by laser aperturing. This method, however, requires significant accuracy and introduces complication into the manufacturing process, thus increasing the possibility of rejects and possibly increasing the costs of manufacture.

SUMMARY OF THE INVENTION

The present invention seeks to provide an improved two-layer water distribution apparatus.

In accordance with an embodiment of the invention there is provided irrigation apparatus comprising first and second layers of sheet material, at least one of the first and second layers being configured in relief and the first and second layers being bonded together at touching surfaces such that the bonding of the touching surfaces defines a liquid conduit, at least one pressure reducing path associated therewith and an exit port from each of the at least one pressure reducing paths.

BRIEF DESCRIPTION OF THE DRAWINGS

The invention will be more fully understood and appreciated from the following detailed description taken in conjunction with the drawings in which.

DETAILED DESCRIPTION OF THE INVENTION

Figure 1:
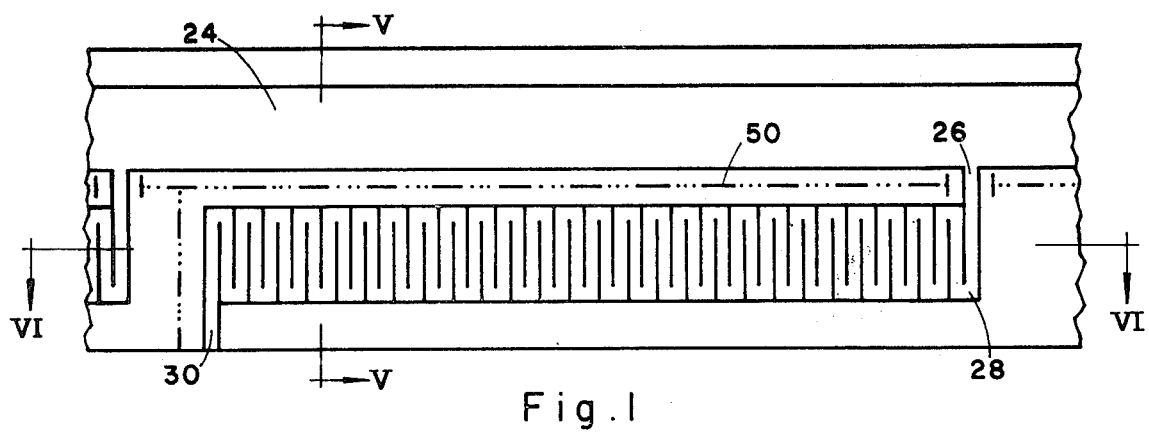
FIG. 1 is a schematic illustration of irrigation apparatus constructed and operative in accordance with an embodiment of the invention.
Figure 6:
FIG. 6 is a sectional illustration of the apparatus of FIG. 1 taken along the lines VI—VI.
Figure 5A:
FIG. 5a is a sectional illustration of the apparatus of FIG. 1 taken along the line V—V.

Referring now to FIGS. 1, 5a and 6, there is seen a portion of drip irrigation apparatus constructed and operative in accordance with an embodiment of the present invention and formed of first and second layers 20 and 22 of sheet material such as PVC of thickness 0.1 mm or of any other suitable material. In accordance with a preferred embodiment of the invention, layer 22 is formed, as by embossing, vacuum deep drawing or any other suitable mechanism or technique to define in relief, a continuous elongate water supply channel 24, a pressure reducng path 28 and a narrow conduit 26 connecting channel 24 to pressure reducing path 28. Pressure reducing path 28 typically includes a large number of bends and turns and may be of any suitable configuration. An exit port 30 leads from the exit of the pressure reducing path 28 to the edge of the layers 20 and 22, for communication to the outside.

It is appreciated that a multiplicity of pressure reducing paths 28 and conduits 26 are associated with a single water supply channel 24 along its length to form a single irrigation unit which is coupled to a water supply source and disposed as desired.

In the preferred embodiment of the invention illustrated in the Figures layer 22 is flat except for the raised portions thereof and is bonded along its flat portions to a confronting flat layer 20, by heat sealing or any other suitable technique. It is to be noted that in accordance with alternative embodiments of the invention, layer 20 may be configured in relief or as a further alternative both layers 20 and 22 may be configured in relief.

It is envisioned that a plurality of units of the type shown in FIG. 1 may be manufactured simultaneously from sheets of plastic of width much greater than that of the apparatus of FIG. 1. It is a particular feature of the invention that the units can be arranged on the sheets of plastic such that the exit ports 30 of two adjacent units are connected, such that longitudinal cutting of the plastic sheets to separate the units also effectively opens the exit ports 30 to the atmosphere.

Figure 2:
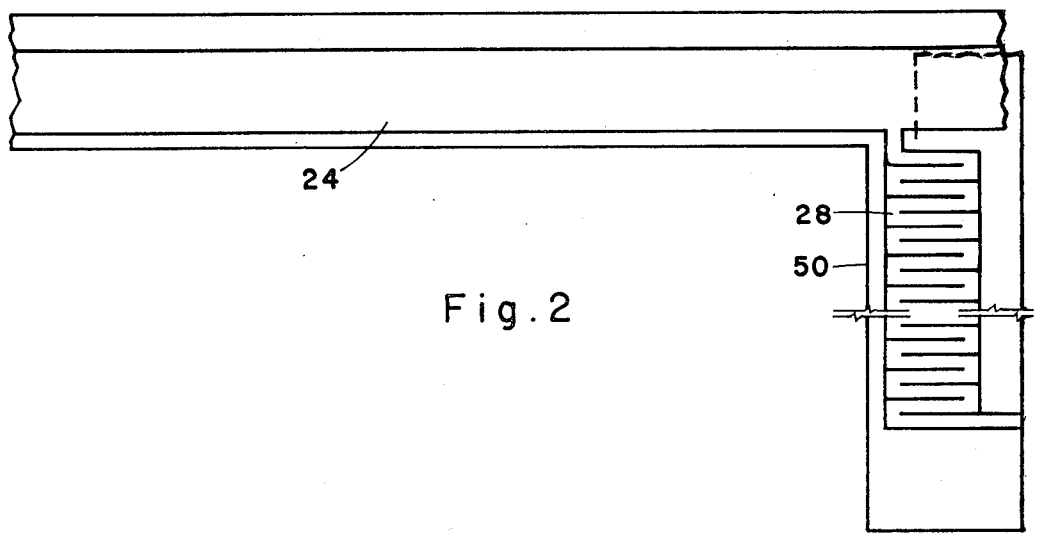
FIG. 2 is a schematic illustration of the irrigation apparatus of FIG. 1 in an alternative configuration.

Reference is now made additionally to FIG. 2, which shows a possible alternative disposition of the irrigation apparatus described hereinabove. in which the pressure reducing path is angled with respect to the liquid conduit. It may be appreciated that the embodiment of FIG. 2 may be substantially identical to that of FIG. 1 except that a longitudinal slit is made where indicated in dashed lines 50 in FIG. 1, thus separating the pressure reducing paths from the remainder of the unit except at conduit 26.

Figure 3:
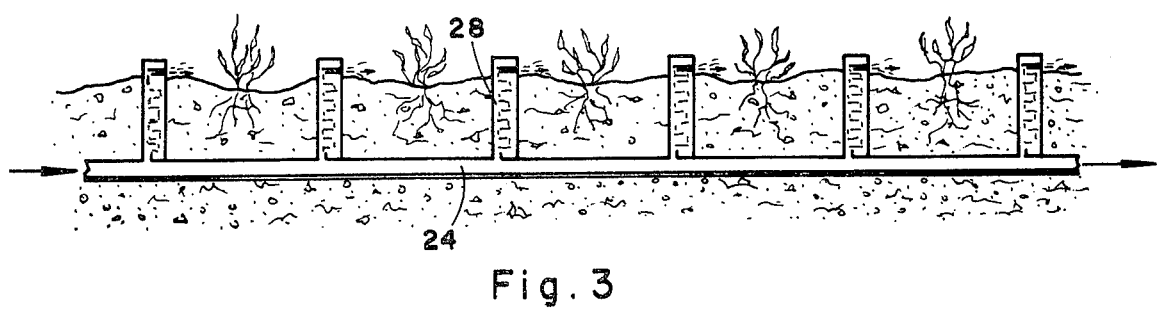
FIG. 3 is a schematic illustration of the irrigation apparatus of FIG. 2 arranged for underground use.

The utility of the embodiment illustrated in FIG. 2 may be appreciated from a consideration of FIG. 3 which shows irrigation apparatus of the FIG. 2 type disposed below the soil surface. The pressure reducing paths 28 are arranged to lie generally perpendicularly to the liquid conduit 24 and extend to or adjacent the soil surface.

Figure 5B:
FIG. 5b illustrates two-sided irrigation apparatus.

FIG. 5b shows a two-sided version of irrigation apparatus and comprises units arranged back to back with a single common intermediate wall.

Figure 4:
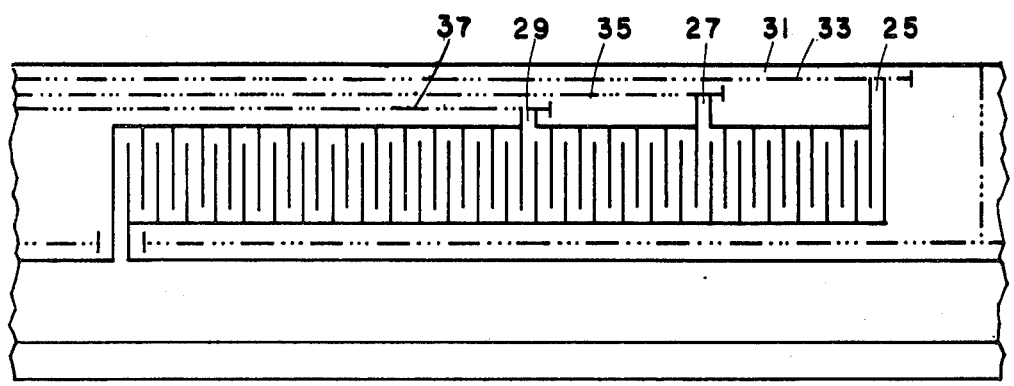
FIG. 4 is a schematic illustration of irrigation apparatus constructed and operative in accordance with an alternative embodiment of the invention.

Reference is now made to FIG. 4 which illustrates irrigation apparatus constructed and operative in accordance with an alternative embodiment of the invention. Here the pressure reducing path 28 is provided with a series of exit ports 25, 27 and 29. Exit ports 25, 27 and 29 are respectively located at the end of path 28, at a point before the end of path 28 and at a point even further from the end of path 28 than the other ports. The exit ports terminate at a distance from the outer edge 31 of the plastic sheets which increases sequentially according to the relative separation of the port from the end of the pressure reducing path 28.

It may thus be appreciated that a desired pressure reducing path length may be selected by opening a given exit port to the atmosphere. Thus if a maximum pressure reduction is desired, the unit should be slit along a line 33 such that port 25 is apertured but the remaining ports remain sealed. If less pressure reduction is required, a longitudinal cut is made along line 35, thus exposing port 27 to the atmosphere and producing a shorter effective pressure reducing path. If a continuous longitudinal cut is made along line 35, port 25 will also be slit, but this is immaterial, since the vast majority of the water will exit via port 27. Similarly if a cut is made along a line 37, exit port 29 will be opened, producing an even shorter effective pressure reducing path.

Figure 7:
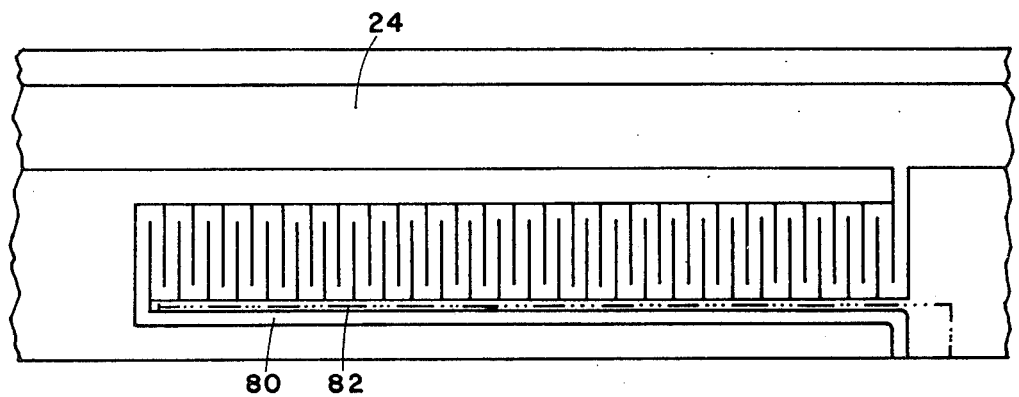
FIG. 7 is a schematic illustration of irrigation apparatus constructed and operative in accordance with still another embodiment of the invention.

Reference is now made to FIG. 7 which shows irrigation apparatus also suitable for underground placement and having an elongated exit port 80 of length suitable for extending from the underground location to a desired watering location. The apparatus is manufactured by the techniques described above from two layers of sheet material and is formed to define a liquid conduit 24 which communicates with a pressure reducing path 28 of any suitable type or configuration. Longitudinal cuts are formed between the pressure reducing path 28 and the elongated exit port 80, typically along the dashed line 82.

Figure 8:
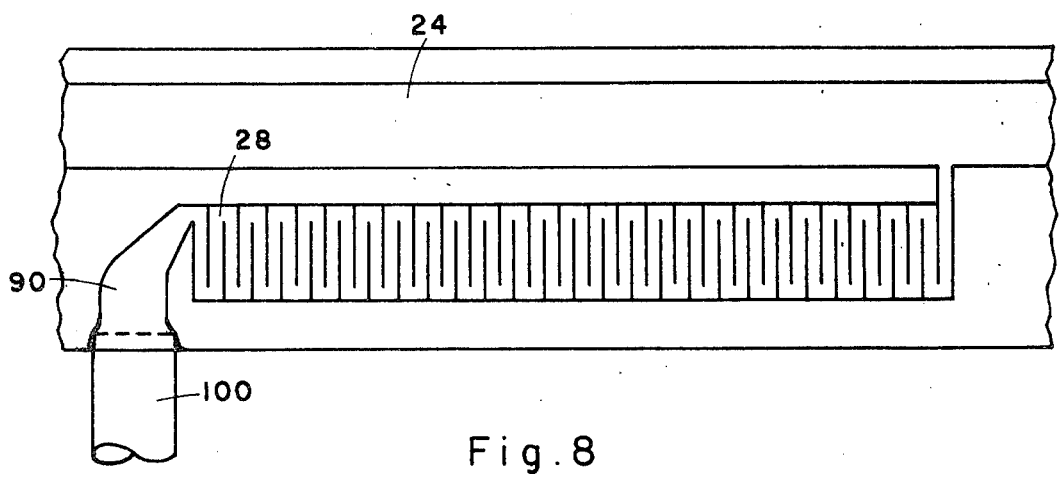
FIG. 8 is a schematic illustration of irrigation apparatus constructed and operative in accordance with still another embodiment of the invention.

Referring now to FIG. 8, there is seen a further alternative embodiment of irrigation apparatus comprising a liquid conduit 24 which communicates with a pressure reducing pathway 28, both of which are formed of two layers of sheet material by techniques substantially similar to those described above. Here, for example, the exit port 90 is configured to accomodate a pipe or tubing 100, which may be any suitable tubing of hard plastic or any other suitable material. The apparatus illustrated in FIG. 8 is thus suitable for underground disposition, and for greenhouse use.

It will be appreciated by persons skilled in the art that the above discussion and examples relate to illustrative embodiments of the invention and are not intended to be exhaustive of possible embodiments of the invention. The invention is not limited by the particular embodiments shown and described herein but rather is defined only by the claims which follow:

I claim:

1. Irrigation apparatus, comprising:
    a first layer of sheet material;
    a second layer of sheet material overlapping said first layer, at least one of said first and second layers of sheet material having preformed raised areas therein between said two layers, said first and second layers being bonded together at touching surfaces surrounding said raised areas in such a manner that a primary flow conduit is formed between said sheet materials, and at least one pressure reducing path, in fluid flow contact with said primary flow conduit, is formed, said pressure reducing path being formed in said sheet materials at raised areas thereof,
    whereby upon use, fluid flows through the primary flow conduit, into the pressure reducing path and exits in a trickle through an exit port which may be opened in said pressure reducing path upon use.

2. Irrigation apparatus according to claim 1 further including an exit port in each of said pressure reducing paths.

3. Irrigation apparatus according to claim 2 wherein said exit port is defined by a raised area of said first and second layers which extends to an edge of said layers.

4. Irrigation apparatus according to claim 2 and wherein said exit port comprises an elongate element which is adapted to extend in a desired location.

5. Irrigation apparatus according to claim 2 and wherein said pressure reducing means is arranged to be couplable to an external tube at said exit port.

6. Irrigation apparatus according to claim 1 wherein the raised areas of said first and second layers are configured to define a plurality of selectably openable exit ports associated with each of said at least one pressure reducing paths thereby to define a selectable effective pressure reducing path length.

7. Irrigation apparatus according to claim 6 wherein said plurality of selectably openable exit ports each terminate at a different transverse distance from an edge of said first and second layers such that selective opening of said plurality of selectably openable exit ports may be achieved by cutting said first and second layers at a given transverse distance from said edge.

8. Irrigation apparatus according to claim 1, further including a normally sealed exit port in each of said pressure reducing paths, said exit ports being selectably openable to permit determination of water distribution patterns.

9. Irrigation apparatus according to claim 1 wherein said primary flow conduit and said pressure reducing path are joined by a flexible fluid pathway which permits said primary pressure reducing path to be angled with respect to said conduit.

10. Irrigation apparatus according to claim 1, further including a third layer of sheet material bonded to one of said first and second layers so as to define a second primary flow conduit, and at least one second pressure reducing path associated therewith.

11. Irrigation apparatus according to claim 10, further including a second exit port in each of said at least one second pressure reducing path.

* * * * *